United States Patent [19]

Le Compte

[11] 3,723,223

[45] Mar. 27, 1973

[54] HEAT CURING ADHESIVE

[75] Inventor: Robert A. Le Compte, Mountain Lakes, N.J.

[73] Assignee: National Starch and Chemical Corporation, New York, N.Y.

[22] Filed: Jan. 11, 1971

[21] Appl. No.: 105,644

[52] U.S. Cl.................156/313, 117/25, 117/161 A, 156/306, 156/330, 260/33.6 EP, 260/837 R, 260/879
[51] Int. Cl. ................................................C08d 9/10
[58] Field of Search ...........260/33.6 EP, 837 R, 879; 156/313, 306, 330; 117/25, 161 A

[56] References Cited

UNITED STATES PATENTS

| | | | |
|---|---|---|---|
| 3,496,250 | 2/1970 | Czerwinski | 260/33.6 EP X |
| 3,239,478 | 3/1966 | Harlan | 260/879 X |
| 2,385,920 | 10/1945 | Jenkins | 260/34.2 |

OTHER PUBLICATIONS

D. J. Duffin, Laminated Plastics, Reinhold, New York, (1958) pp. 163-165.

*Primary Examiner*—Morris Liebman
*Assistant Examiner*—S. M. Person
*Attorney*—James & Franklin

[57] ABSTRACT

An adhesive material having a long storage life is prepared by applying to a carrier, a coating composition comprising a blend of a solid epoxy resin, solid curing agent for the expoxy resin, a film-forming binder, and a dispersing medium and drying the coating to a tack-free film. The adhesive-coated carrier or the film without the carrier may be used to bond substrates by pressing the substrates together with the adhesive film between them at elevated temperatures.

19 Claims, No Drawings

HEAT CURING ADHESIVE

This invention relates to a novel method of forming a thermosetting, one-component adhesive film having a long shelf life. The adhesive film will develop a rigid, high strength, thermoset bond rapidly at moderately elevated temperatures.

Two-component epoxy resins have been used in adhesive compositions for some time due to their excellent adhesive properties. However, the use of thermosetting 2-component epoxy resins as adhesives involves a great drawback. The adhesive containing the mixed resin and the curing agent or hardener does not have a long shelf life. That is, the mixture of epoxy resin and curing agent, even at room temperature, begins to react as soon as mixed and becomes unuseable after only short periods of time if highly reactive curing agents are used. This is undesirable as oftentimes it is desirable to store the premixed resin and curative before the adhesive composition is ready to be used. If slower reacting curatives are used to extend the room temperature storage life of the mixed components, the curing time as elevated temperatures is often prohibitively long (in excess of 1 hour).

It has now been discovered that an adhesive composition comprising a thermosetting epoxy resin and hardener may be formulated so that a fast bond may be achieved at moderate temperatures with short heating times while the adhesive still retains long storage life at room temperature.

The novel method of this invention comprises coating or impregnating a carrier with a coating composition comprising a blend of a room-temperature, solid epoxy resin, a room-temperature solid curing agent for said epoxy resin, a film forming binder, and a dispersing medium and drying the coating to a tack-free film. The coated carrier or the unsupported film removed from the carrier, if the carrier is a release material, may then be used as an adhesive by merely pressing a substrate to be bonded to the film at elevated temperatures.

The coating composition comprises a solid epoxy resin, solid hardener, binder and dispersing medium.

The epoxy resin may be a room-temperature solid epoxy resin that averages more than one, 1,2-epoxy group per molecule. A broad range of compounds containing 1,2-epoxy groups have use in the adhesive compositions of the present invention. These epoxy resins should be solids at room-temperature. The uncured resin should soften at temperatures above about 60°C. or even 125°C. or higher; and in the uncured state, even without other components present, they preferably are sufficiently brittle at room temperature as to be pulverizable. They must average more than one 1,2-epoxy group per molecule for crosslinking. The room-temperature-solid commercial varieties of diglycidyl ethers of polyhydric phenols, particularly the diglycidyl ether of bisphenol A, are preferably and commonly used. However, synthesized, internally-complex, 1,2-epoxy containing compounds are also used and their use achieves variation in the properties of the cured products. Epoxy-terminated polyesters and polyamides may also be used. Other examples of solid epoxy resins which may be used in the coating compositions are solid aromatic adducts of diglycidyl ethers of bisphenol A (Epon U–52), solid diglycidyl ethers of bisphenol A such as Epon 1002 and Epon 1007. Tetrafunctional polyglycidyl ethers of tetraphenylene ethane such as Epon 1031, polyglycidyl ethers of orthocresolformaldehyde novolac such as Ciba ECN1299, blends of tetrabromo bisphenol A, bisphenol A and epichlorohydrin such as DOW DER511 octafunctional glycidyl ethers such as Celanese SU–8 and the like.

The hardeners for the epoxy resins must also be solid at room temperature. Any room-temperature solid hardener or curing agent for epoxy resins may be used, such as heat-activatable aromatic or aliphatic polyamines or their adducts. These polyamine compounds have at least two primary or secondary nitrogen atoms and a combined total of at least three active hydrogen atoms. Examples of these compounds are meta-, ortho-, and paraphenylene diamines, 4,4-methylene dianiline, diamino-diphenyl sulfone, 1,4-naphthalene-diamine, 3,4-toluene diamine, oxydianiline, triethylene, tetramine, tetraethylenepentamine and alicyclic polyamines. Other curing agents may also be used such as substituted imidazole salts, anhydrides, substituted triazines, solid organic acids, $BF_3$ complexes, and the like.

The binder may be any film-forming non-liquid thermoplastic binder resin which is soluble or emulsifiable in the dispersing medium and will not chemically react with the epoxy resin or hardener so that their curing properties are destroyed. By non-liquid it is meant to include materials with viscosity at 25°C. of greater than 1,000,000 c.p.s. Thus materials having lower viscosities would not be suitable as binders in this invention.

The binder is used to hold the epoxy particles and hardener particles on the backing or carrier reducing contact between them. The binder must be thermoplastic so as not to interfere with the heat cure and flow of the adhesive during the laminating process. Some examples of film-forming thermoplastic binders are: polyethylene oxide, such as Union Carbide's Polyox WSRN-10, thermoplastic acrylic resins, such as Rohm & Haas' Acryloid F–10, vinyl ethyl ether resins, such as Union Carbide's EDBN, styrene-butadiene-styrene block copolymers, such as Shell Chemical's Kraton 1101, polyvinyl acetate; polyvinyl alcohol, and the like.

The dispersing medium is necessary to apply the film-forming binder. Although the solid particles of epoxy and hardener are much less reactive with one another than are their liquid counterparts, some premature cure is found when the particles are contiguous to one another. The use of the dispersing medium slows the premature cure by decreasing the concentration of reactive particles and by causing the dissolved binder to surround each particle keeping it from intimately contacting other reactive particles.

Any dispersing medium which is a non-solvent for both the epoxy and the hardener and a solvent or dispersing medium for the binder resin and is volatile so that it is easily removable, may be used. As the dispersing medium is different for each epoxy, hardener and binder that is used in this system, many common solvents may be used depending on the system.

Examples of some dispersing agents useful herein are water, aliphatic hydrocarbons such as heptane, hexane, VM&P naphtha and the like, alicyclic hydrocarbons such as cyclohexane and the like, alcohols such as ethanol, butanol and the like, polyfunctional alcohols such as the glycols, low boiling phthalates such as $C_6H_4(COOCH_3)_2$ and the like.

The amount of hardener used in the composition, of course, depends on the particular epoxy used and the amount of epoxy used. Generally, an amount sufficient to crosslink the epoxy is used.

The binder is generally present in an amount no greater than about 95 percent by weight based on the total solids and usually greater than about 1 per cent by weight based on the total solids. Enough binder is necessary to hold the epoxy and hardener on the backing or carrier or in film form after the coating operation and to envelop the particles so as to protect them from contact with one another.

The amount of dispersing medium used may be varied greatly, but it is preferred to use coating compositions comprising between about 5 per cent and about 99 per cent dispersing medium. If less than about 5 per cent dispersing medium is used, the viscosity of the dispersion increases to unworkable levels at room temperature and if greater than 99 per cent dispersing medium is used, excessive quantities of the dispersion must be coated to produce a useable film.

In general, the preferred method of preparing the adhesive composition, is to grind the solid epoxy resins into small particles and admix the dispersing medium and binder, and then adding the powdered curing agent. The dispersed powders may then be milled to a fine particle size, or simply mixed if the powders are already fine enough when they are added to the composition. The preferred average particle size is less than 0.032 inch. Finely powdered epoxy resin and hardener are necessary to insure good mix during the period of melt and flow as the adhesive composition is being hot pressed.

The adhesive composition may also contain various other materials such as fillers, pigments, dyes, other types of thermosetting and thermoplastic resins, and the like.

The carrier may be coated or impregnated with the adhesive composition using any of the well-known coating methods, such as spraying, roll-coating, curtain-coating, dip-coating, and the like. The thickness of the coating may vary widely but generally it is preferred to use a thickness of from about 0.5 mils to about 100 mils, or thicker if a thick carrier is to be impregnated.

If preferred, the carrier may be coated on both sides or impregnated with the adhesive composition and the coated or impregnated carrier could be used as a crossband material where materials could be bonded together by pressing both materials to both sides of the coated crossband and heating to form a laminate.

It is noted that by the term "impregnating" we mean also, the addition of the compositions to the carrier material prior to the formation of the carrier material. Thus an asbestos paper or other fibrous material may be impregnated by preparing a slurry of asbestos fibers in water and adding the composition of this invention and subsequently forming the asbestos sheet by applying the slurry to a screen and drying to a sheet form. In this way, an impregnated asbestos sheet is formed. Of course, this method also could be used to impregnate glass fiber mats by admixing the compositions of this invention to the glass fiber slurry and forming a mat out of the composite.

The carrier to which the adhesive composition is applied may be any sheet material. It may be release paper, such as silicone-coated paper, and the like, or it could be polyethylene, wood veneer, resin-impregnated paper, fabrics, cloth, non-woven glass mat, woven glass fabric, untempered hardboard, and the like. The preferred backing is non-woven glass mat.

The adhesive composition is applied to the carrier and then dried to drive off the dispersing medium leaving the epoxy resin particles and hardener particles encased in the binder resin. The adhesive composition may be dried by forced warm air at a temperature below the softening point of the binder resin and the other components of the composition.

The coated carriers may then be stored for long periods prior to their use as a component for forming laminates.

The laminates are formed by hot-pressing a substrate to the coated carrier or crossband. If the carrier is coated on both sides or impregnated, two substrates may be laminated together by merely placing a substrate on either side of the coated carrier or adhesive film and subjecting to a hot-press cycle. The substrates will form strong bonds with the coated carrier or to each other.

The laminating may be carried out by inserting the composite of coated carrier and substrate or substrates in a press at about 200°F to about 400°F, at a pressure of from about 10 pounds per square inch to about 1,000 pounds per square inch for a period of from about 20 seconds to about 10 minutes or more, depending on the cure time the epoxy composition requires.

Many substrates may be used as materials to be bonded. Some examples are wood, wood veneer, paper, metals, felt, glass, plastics, masonry, ceramics, particle board, and the like.

The adhesive-coated-carrier may also be used to form multi-layer, or single layer, high strength rigid, internally reinforced, structural sheet materials, useful for translucent building panels, electrical insulators, molded chair shells, furniture parts and the like. To form these structural objects the resin-coated or impregnated carrier is hot-pressed between two surfaces to which it will not ordinarily adhere, such as teflon, polyethylene, or silicone-treated surfaces and the like, until the resin particles have flowed together, fused and cured to a rigid thermoset epoxy composition.

The composite laminates produced are very useful as furniture material, such as table-tops, desk-tops, cabinet components, and the like, but may also be used for counter tops, wall coverings, floor coverings, building panels and the like.

The following examples set forth specific embodiments of the instant invention. The invention, however, is not to be construed as being limited to these embodiments for there are, of course, numerous possible variations and modifications. All parts and percentages in the examples, as well as throughout the specification, are by weight unless otherwise indicated.

EXAMPLE 1

200 parts of a solid aromatic amine epoxy terminated adduct (Epon U52)

70 parts of a solid aliphatic polyamine adduct (Epi-Cure 824)

27 parts of a 25 percent solution of high molecular weight vinyl ethyl ether resin in mineral spirits (EDBN)

400 parts of VM&P naphtha

The mixture was milled for 72 hours. The resultant dispersion was brushed on a 0.020 inch non-woven glass sheet (having continuous filaments which have been treated with a starch-oil binder) at a coating weight of about 33 pounds per 1,000 sq. ft. The coated mat was allowed to dry at room temperature overnight and was then pressed in a heated platen press for two minutes at 100 psi and 300°F., between one twenty-fourth inch poplar veneer and three-fourths inch cedar particleboard. Upon removal from the press, the resultant laminate exhibited excellent properties.

EXAMPLE 2

A vessel was charged with 75 parts of a tetrafunctional polyglycidyl ether of tetraphenylene ethane (Epon 1031) and 75 parts of a solid diglycidyl ether of bisphenol A (Epon 1001) and the materials were heated separately for 2 hours at 300°F. to allow volatile materials and dissolved gases to escape. A steel ball mill was then charged with the above epoxies and 60 parts of an aniline formaldehyde aromatic amine adduct (Epi-Cure 844) 422.5 parts of cyclohexane and 4.5 parts of a styrene-butadiene-styrene block copolymer (Kraton 1101). The composition was milled for 16 hours. The resultant composition was a creamy liquid. It was then brush-coated onto a 1 ounce per sq. ft. chopped strand glass fiber reinforcing mat, (Owens-Corning M–901 reinforcing mat) at a coating weight of about 66 pounds per 1,000 sq. ft. The coated mat was allowed to dry 1 hour at room temperature followed by 10 minutes at 120°F. in a forced air oven. It was pressed in a heated platen press immediately and also after seven days aging at 120°F., for three minutes at 300°F. and 100 psi, between three-fourths inch particle board and one twenty-eighth inch walnut veneer. The resulting laminates exhibited excellent properties.

The coated mat was also pressed between sheets of teflon film for 1 minute at about 300°F., and 500 psi and the cured impregnated mat exhibited excellent physical properties.

EXAMPLE 3

An asbestos paper was impregnated by the following method:

A high shear mixer was charged with 10 parts of asbestos fiber and 2,000 parts of water. To the dispersion were added 33 parts of a composition comprising 75 parts of Epon 1001, 75 parts of an octafunctional glycidyl ether, 45 parts of the aniline formaldehyde aromatic amine adduct of Example 2, 4.5 parts of the styrene butadiene-styrene block copolymer of Example 2, and 387.5 parts of cyclohexane.

While agitating 8 parts of a soap solution comprising 94 percent water, 4 percent oleic acid, and 2 percent triethanolamine were added.

The slurry was poured on a screen and pressed between absorbent paper sheets and dried. The resulting dry impregnated asbestos paper had excellent high strength properties after being pressed.

Although specific examples have been set forth above, it is not intended that the invention be limited solely thereto, but to include all of the variations and modifications falling within the scope of the appended claims.

I claim:

1. A method of providing an adhesive material comprising coating or impregnating a carrier with a composition comprising a blend of a room temperature solid epoxy resin averaging more than one 1,2-epoxy group per molecule, a room temperature solid epoxy reactive hardener in an amount sufficient to crosslink the epoxy resin, said resin and said hardener constituting from 99 percent to 5% by weight of the total solids content, a film forming thermoplastic binder constituting from 1 to 95 percent by weight of the total solids, and a dispersing medium constituting from 5 to 95 percent by weight of the entire said composition which is a non-solvent for the epoxy and the hardener and which is a solvent or dispersant for the binder, and drying the coating to a tack-free state.

2. The method of claim 1 wherein the carrier is fiberglass sheet material.

3. The method of claim 1 wherein the carrier is asbestos sheet.

4. The method of claim 3 wherein the asbestos sheet is impregnated by forming a slurry of asbestos fibers in water and adding the composition to the slurry and forming the composite into a sheet.

5. The method of claim 1 wherein the hardener is a polymeric aniline formaldehyde aromatic amine adduct.

6. The method of claim 1 wherein the binder is a styrene-butadiene-styrene block copolymer.

7. The method of claim 1 wherein the dispersing medium is cyclohexane.

8. The method of claim 1 wherein the epoxy resin is a solid diglycidyl ether of a polyhydric phenol.

9. An adhesive material comprising a carrier coated or impregnated with a material comprising a thermoplastic binder constituting 1 to 95 percent by weight of said material having dispersed therein discrete solid particles of epoxy resin averaging more than one 1,2-epoxy group per molecule and discrete solid particles of a heat reactivatable epoxy reactive hardener, said resin and said hardener together constituting from 99 to 5 percent by weight of said adhesive material.

10. The adhesive material of claim 9 wherein the carrier is fiberglass sheet material.

11. The adhesive material of claim 9 wherein the hardener is an aniline formaldehyde aromatic amine adduct.

12. The adhesive material of claim 9 wherein the binder is a styrene-butadiene-styrene block copolymer.

13. The method of forming a laminate comprising (1) applying to a carrier a coating composition comprising a blend of a room temperature solid epoxy resin averaging more than one 1,2-epoxy group per molecule, a room temperature solid epoxy reactive hardener in an amount sufficient to crosslink the epoxy resin, said resin and hardener together constituting from 99 to 5 percent by weight of the total solids content, a film forming thermoplastic binder constituting from 1 to 95 percent by weight of the total solids, and a dispersing medium constituting from 5 to 95 percent by weight of the said composition which is a non-solvent for the epoxy and the hardener and a solvent or dispersing medium for the binder, (2) drying the coating to a tack-free film and, (3) placing a substrate against the coated side of the carrier and subjecting the composite to a hot pressing operation.

14. The method of claim 13 wherein both sides of the carrier material are coated and two substrates are laminated to one another by pressing each substrate to a side of the coated carrier at high temperature.

15. The method of claim 13 wherein the carrier is fiberglass sheet material.

16. The method of claim 13 wherein the binder is a styrene-butadiene-styrene block copolymer.

17. The method of claim 13 wherein the hardener is an aniline formaldehyde aromatic amine adduct.

18. The method of claim 13 wherein the dispersing agent is cyclohexane.

19. The method of claim 13 wherein the epoxy resin is a solid diglycidyl ether of a polyhydric phenol.

* * * * *